United States Patent
Magoshi (10) Patent No.: US 6,988,187 B2
(45) Date of Patent: Jan. 17, 2006

(54) COUNTING INSTRUCTIONS TO SKIP IN SUPERSCALER PROCESSOR

(75) Inventor: Hidetaka Magoshi, Palo Alto, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 446 days.

(21) Appl. No.: 10/200,790

(22) Filed: Jul. 22, 2002

(65) Prior Publication Data

US 2003/0182541 A1 Sep. 25, 2003

Related U.S. Application Data

(60) Provisional application No. 60/366,509, filed on Mar. 21, 2002.

(51) Int. Cl.
G06F 9/38 (2006.01)

(52) U.S. Cl. .................. 712/218; 712/219; 712/234
(58) Field of Classification Search ................ 712/218, 712/219, 234
See application file for complete search history.

(56) References Cited

U.S. PATENT DOCUMENTS

| | | | | |
|---|---|---|---|---|
| 5,724,565 A | * | 3/1998 | Dubey et al. ............... 712/245 |
| 5,799,180 A | * | 8/1998 | Shiell et al. ................ 712/234 |
| 5,832,260 A | * | 11/1998 | Arora et al. ................ 712/239 |
| 5,838,961 A | * | 11/1998 | Smith ......................... 712/233 |
| 6,256,728 B1 | * | 7/2001 | Witt et al. .................. 712/236 |
| 6,725,365 B1 | * | 4/2004 | Cofler et al. ............... 712/233 |

* cited by examiner

Primary Examiner—Kenneth S. Kim

(57) ABSTRACT

A method is provided for use in a processing pipeline operable to dispatch a plurality of instructions up to a first number of instructions per cycle to execution stages of the pipeline. According to such method, a skip instruction is decoded in a first cycle of the processing pipeline to determine a total number of subsequent instructions in the processing pipeline that are to be skipped. The skip instruction is executed in a second cycle. Subsequent instructions in the processing pipeline are prohibited from being executed, including prohibiting execution of a second number of instructions subsequent to the skip instruction in the second cycle, the second number being variable between zero and one less than the first number. Thereafter, if any subsequent instructions of the total number remain to be skipped, then a third number of instructions are prohibited from being executed in a third cycle subsequent to the second cycle, the third number being variable up to the lesser of: the number of subsequent instructions which remain to be skipped and the first number.

20 Claims, 4 Drawing Sheets

COUNTING INSTRUCTIONS TO SKIP IN SUPERSCALER PROCESSOR

CROSS-REFERENCE TO RELATED APPLICATIONS

This application claims the benefits of U.S. Provisional Patent Application Ser. No. 60/366,509, filed Mar. 21, 2002, entitled METHODS AND APPARATUS FOR PROCESSING BRANCH INSTRUCTIONS, the entire disclosure of which is hereby incorporated by reference.

BACKGROUND OF THE INVENTION

The present invention relates to methods and apparatus for processing pipeline instructions and, more particularly, to processing forward branch (or jump) instructions that affect a forward advancement in the sequential instructions of a processing pipeline by nullifying only those instructions already in the pipeline that are to be skipped.

Microprocessors execute software programs that include a plurality of instructions, such as ADD, LOAD, MOV, AND, OR, etc. Microprocessor instruction sets typically support so-called branch (or jump) instructions, which alter the instruction flow of the microprocessor by abruptly discontinuing a sequential flow of the instructions. This can involve branching to an altogether separate portion of the program, advancing one or more instructions ahead in the sequence, moving back one or more instructions in the sequence, etc.

Figure 1:
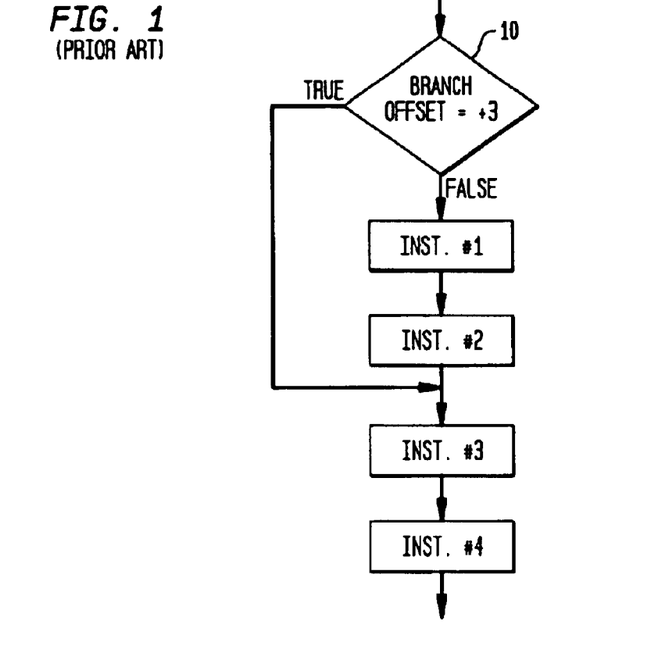
FIG. 1 is a flow diagram illustrating a process flow of a branch instruction in accordance with the prior art.

FIG. 1 is a flow diagram illustrating the process flow through a plurality of instructions including a branch forward instruction and other instructions, i.e., instruction #1, instruction #2, instruction #3, and instruction #4. At action 10, the branch instruction is analyzed to determine where the process should branch. More particularly, an offset associated with the branch instruction is obtained and used to determine how many instructions in the sequence should be skipped. In this example, the offset is +3, indicating that the processes flow should advance by three instructions (from the current instruction), thereby skipping instruction #1 and instruction #2. The advance of three instructions in the sequence is only carried out if a condition is met, such as whether a flag bit or the contents of a register is greater than, equal to, less than, etc. a particular value. Assuming that the condition is met (i.e., the condition is true), then the process flow at action 10 advances to instruction #3, which is a forward advancement of three through the sequential instructions. On the other hand, if the condition is not met (i.e., the condition is false), then the process flow advances to the next instruction in the sequence, in this example instruction #1 is carried out.

The change in the instruction flow illustrated in FIG. 1 (i.e., skipping instruction #1 and instruction #2) when the condition is true is accomplished by modifying a program counter of the microprocessor, which points to an address in memory of the next instruction to be fetched, decoded, executed, etc. Thus, branch instructions are usually defined as follows:

BRANCH condition, offset

If condition=true, then $PC \leftarrow PC+\text{offset}$

Figure 2:
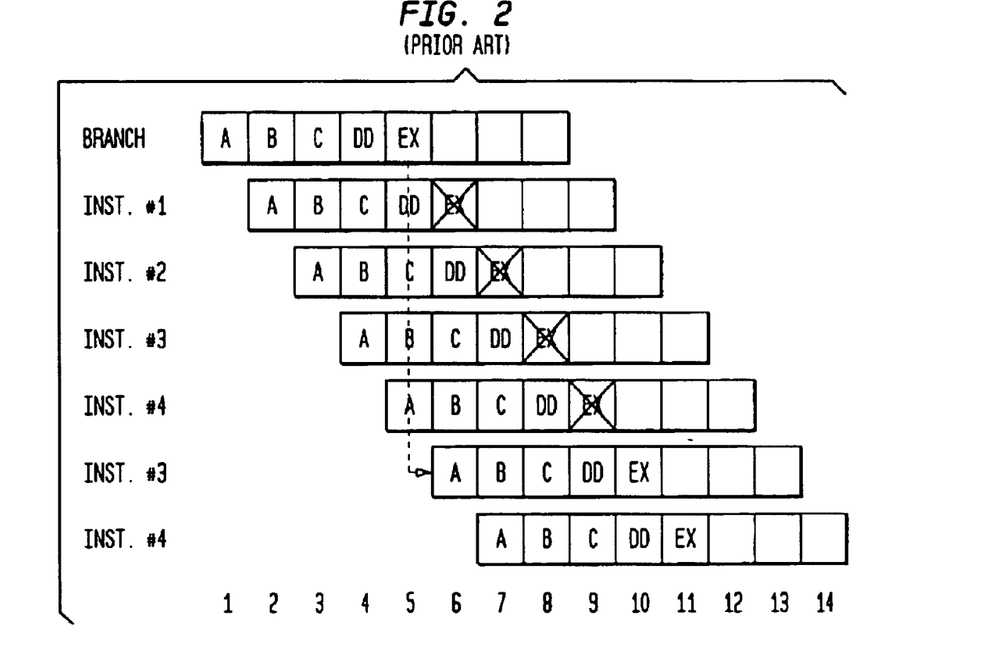
FIG. 2 is a high level pipeline sequence diagram illustrating the processing of a branch instruction in accordance with the prior art.

Reference is now made to FIG. 2, which is a sequence diagram illustrating how the instructions of the process flow of FIG. 1 are carried out in a single scalar processor. A single scalar processor is a processing pipeline in which a single instruction is dispatched into the pipeline at any particular cycle and only one instruction is capable of being executed in any given cycle. Each of the instructions, branch, instruction #1, instruction #2, instruction #3, and instruction #4, is shown opposite a plurality of sequentially disposed boxes, where each box represents an operation carried out by the pipeline in a particular stage or cycle. Eight sequential boxes are shown for each instruction and each set of eight boxes are offset by one cycle, which is consistent with the forward pipeline behavior of a single scalar processor pipeline.

The specific sequence in the pipeline is as follows: The branch instruction enters the pipeline at cycle 1 and a particular operation, A, is performed during that cycle, although for the purposes of this example the specifics of that operation are not important. At cycle 2, the branch instruction advances to the next stage of the pipeline where another operation, B, is carried out. Instruction #1 enters the first stage of the pipeline in cycle 2, where operation A is carried out on that instruction. In cycle 3, the branch instruction advances to a third stage in the pipeline, where a new operation, C, is carried out on that instruction. Instruction #1 advances to the second stage of the pipeline in cycle 3, where operation B is performed. Instruction #2 enters the first stage of the pipeline at cycle 3, where operation A is performed on that instruction.

In cycle 4, the branch instruction advances to a fourth stage of the pipeline, where a decode and dispatch operation, DD, is carried out. Instruction #1 advances to the third stage in the pipeline in cycle 4, where operation C is carried out on that instruction. Similarly, instruction 2 advances to the second stage of the pipeline and instruction #3 enters the first stage of the pipeline in cycle 4. In cycle 5, the branch instruction advances to a fifth stage in the pipeline where an execution operation, EX, is carried out. At the fifth cycle, instruction #1 has entered the fourth stage of the pipeline, instruction #2 has entered the third stage of the pipeline, instruction #3 has entered the second stage of the pipeline, and instruction #4 has entered the first stage of the pipeline.

The execution of the branch instruction in the fifth cycle, however, modifies the program counter of the microprocessor (assuming that the condition is true, see action 10, FIG. 1) such that it points to an address in memory corresponding to where instruction #3 is stored. This is illustrated in FIG. 2 by the dashed line extending from the fourth stage of the pipeline for the branch instruction to the first stage in the pipeline for the second occurrence of instruction #3. In keeping with the process flow illustrated in FIG. 1, instruction #1 and instruction #2 should be skipped and instruction #3 should be executed. To achieve this, each of the execution operations EX for instructions #1–#4 in cycles 6, 7, 8, and 9 are nullified (cancelled) as illustrated by the "X" in those boxes. Further, instruction #3 re-enters the first stage of the pipeline in cycle 6, and instruction #4 re-enters the first stage of the pipeline in cycle 7. Thus, after the sequential operations A, B, C, and DD are again carried out, instruction #3 and instruction #4 are executed in cycles 10 and 11, respectively.

Although the pipeline process illustrated in FIG. 2 achieves the process flow illustrated in FIG. 1, certain disadvantages become evident. When the branch instruction is executed, the value of the program counter is overwritten, which can degrade the performance of the pipeline because, among other reasons, it nullifies all cycles (or stages, slots, etc.) in the pipeline instead of only those that should be skipped. For example, the execution of instruction #3 and instruction #4 in cycles 8 and 9, respectively, was nullified even though such execution would be desirable. Indeed, because instruction #3 and instruction #4 were skipped (nullified) they must re-enter the first stage of the pipeline in cycles 6 and 7, respectively, and all of the operations leading up to the execution operations (e.g., A, B, C, DD) must be repeated. The resultant nullified stages in the pipeline, i.e., the fifth stage of the pipeline in cycles 8 and 9, degrade the overall performance of the pipeline and reduce throughput. Indeed, where the execution of instruction #3 and instruction #4 would have occurred in cycles 8 and 9, respectively, such execution is delayed by two cycles, i.e., to cycles 10 and 11, respectively.

It is noted that the undesirable nullification of instructions in the pipeline occurs most often when relatively small forward branches are made. This is so because the protocol followed by the microprocessor dictates that all execution operations in the pipeline are to be nullified irrespective of whether certain of the instructions already in the pipeline should still be executed, as would occur when the offset is relatively small.

Conventional methods to avoid the above disadvantages employ so-called conditional instructions (e.g., conditional MOV), which are executed only if a specified condition within the instruction is true. Turning again to FIG. 1, if conditional instructions were employed, the branch instruction, instruction #1 and instruction #2 would be replaced with two conditional instructions, which would be executed only if the specified conditions were true. Unfortunately, conditional instructions require the assigning of unique opcodes or unique operand bits within the instruction and, consequently, very few microprocessor instruction sets support conditional instructions.

Accordingly, there are needs in the art for new methods and apparatus for processing pipeline instructions where forward branch instructions may be effected in a processing pipeline without modifying the program counter, and without nullifying instructions already within the pipeline that will have to be re-introduced into the pipeline. Indeed, such new methods and apparatus would desirably achieve an increase in pipeline performance including higher throughputs and improved data processing.

SUMMARY OF THE INVENTION

In accordance with one or more aspects of the present invention, a method includes: introducing a plurality of instructions into respective stages in a multistage processing pipeline; and prohibiting execution of only those one or more instructions already in the pipeline that should be skipped to effect a forward branch.

In accordance with one or more further aspects of the present invention, a method includes: decoding a skip instruction in a first cycle of a processing pipeline to obtain at least an offset value, the offset value representing a potential number of subsequent instructions in the processing pipeline that are to be skipped; executing the skip instruction in a second cycle of the processing pipeline to determine whether a specified condition of the skip instruction indicates that the number of instructions represented by the offset value should be skipped; using the offset value to establish a count value; and prohibiting execution of subsequent instructions in the processing pipeline when (i) the specified condition value indicates that such instructions should be skipped, and (ii) the count value differs from a steady state value.

The method also preferably includes: permitting execution of subsequent instructions in the processing pipeline when at least one of (i) the specified condition indicates that such instructions should not be skipped, and (ii) the count value equals the steady state value.

The count value is preferably incremented or decremented in one or more cycles of the processing pipeline until the count value equals the steady state value. Most preferably, the count value is set to equal the offset value and the count value is decremented in the one or more cycles of the processing pipeline until a steady state value of zero is obtained.

In the case of, for example, a single scalar pipeline processor, the count value is incremented or decremented once in a given cycle, which is directly proportional to the number of instructions that are prohibited from being executed in that cycle. When, for example, a super scalar pipeline processor is employed, the count value is preferably incremented or decremented in a given cycle by an amount proportional to a number of the instructions that are prohibited from being executed in that cycle. Thus, for example, when two instructions may be executed in a given cycle of the pipeline and both of such instructions are prohibited from being executed, the count value is preferably incremented or decremented by a value proportional to two.

In accordance with one or more further aspects of the present invention, the methods for processing pipeline instructions described thus far, and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc.

In accordance with one or more further aspects of the present invention, an apparatus includes: an instruction decoding unit operable to decode a skip instruction in a first cycle of a processing pipeline to obtain at least an offset value, the offset value representing a potential number of subsequent instructions in the processing pipeline that are to be skipped; a skip instruction unit operable to execute the skip instruction in a second cycle of the processing pipeline to determine whether a specified condition of the skip instruction indicates that the number of instructions represented by the offset value should be skipped and to set an instruction skip signal to a value indicative of the determination; and an instruction skip counter operable to (a) receive the offset value and to use it to establish a count value, and (b) produce an instruction nullifying signal indicating that execution of subsequent instructions in the processing pipeline should be prohibited when (i) the value of the instruction skip signal indicates that such instructions should be skipped, and (ii) the count value differs from a steady state value.

The instruction skip counter is preferably further operable to produce the instruction nullifying signal such that it indicates that execution of subsequent instructions in the processing pipeline should be executed when at least one of (i) the value of the instruction skip signal indicates that such instructions should not be skipped, and (ii) the count value equals the steady state value.

Preferably, the skip instruction counter is further operable to increment or decrement the count value in one or more cycles of the processing pipeline until the count value equals the steady state value.

It is most preferred that the skip instruction counter is operable to set the count value equal to the offset value and to decrement the count value in the one or more cycles of the processing pipeline until the steady state value of zero is obtained.

Other aspects, features, advantages, etc. of the present invention will become apparent from the description herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 3:
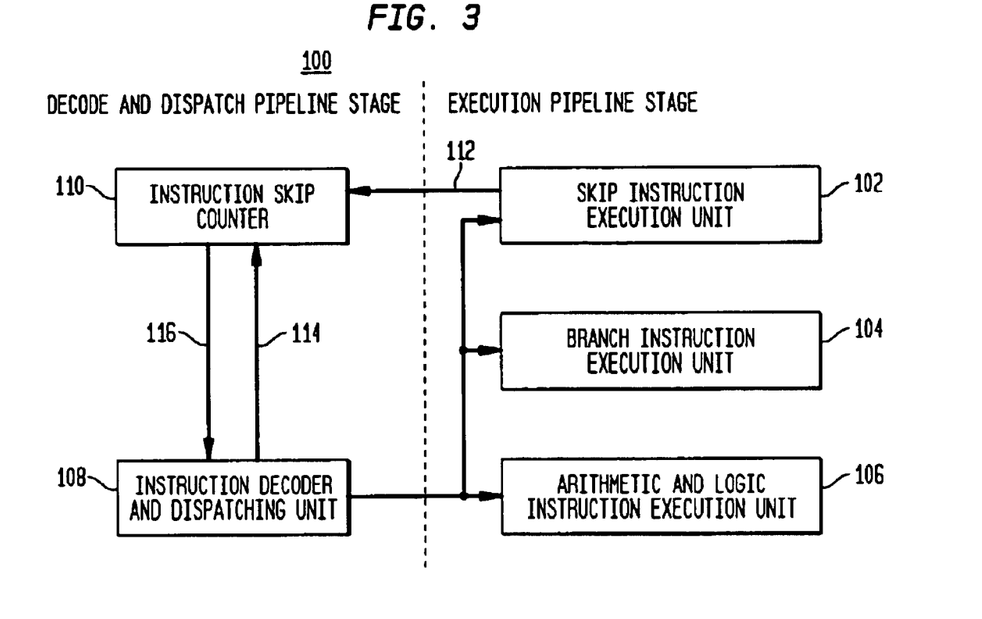
FIG. 3 is a block diagram illustrating a processing system in accordance with one or more aspects of the present invention.

With reference to the drawings, wherein like numerals indicate like elements, there is shown in FIG. 3 a processing apparatus 100 in accordance with one or more aspects of the present invention. The processing apparatus 100 may, for example, be a microprocessor. The processing apparatus 100 preferably includes a skip instruction execution unit 102, a branch instruction execution unit 104, an arithmetic and logic instruction execution unit 106, an instruction decoder and dispatching unit 108, and an instruction skip counter 110. It is noted that the functional blocks illustrated in FIG. 3 are partitioned for the purposes of discussion only and any variation or modification in the partitioning of such functional blocks may be made without departing from the spirit and scope of the invention. For example, the skip instruction execution unit 102 and the branch instruction execution unit 104 may be integrally combined. Other such combinations (or further partitions) may be made and are contemplated by the invention.

In a general sense, the processing apparatus 100 preferably executes branch instructions with a relatively near forward target address without overwriting (or modifying) the value of the program counter, and by nullifying the execution of only those instructions that are to be skipped by the branch instruction. A relatively near forward target address may mean, for example, a relatively low offset as compared to the number of different instructions in the pipeline at any point in time. Branch instructions having relatively near forward target addresses are distinguished from branch instructions having relatively large forward offsets (or reverse offsets) and may be referred to herein as skip instructions. Skip instructions are preferably identified within the processing apparatus 100 by assigning special opcodes or by evaluating the offset value of a branch instruction to determine whether it represents a relatively near forward target or not.

Figure 4:
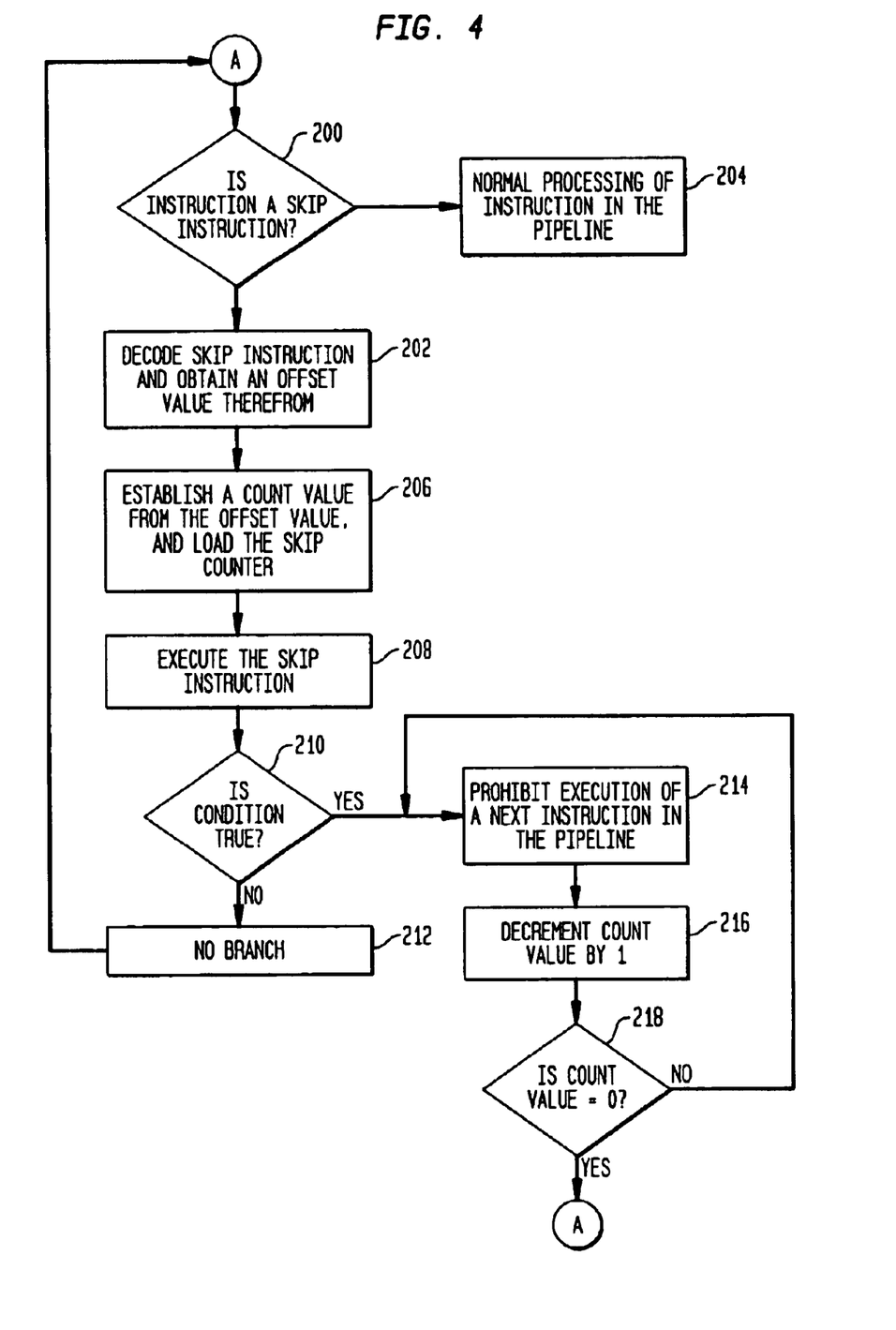
FIG. 4 is a flow diagram illustrating a process flow in accordance with the present invention.
Figure 5:
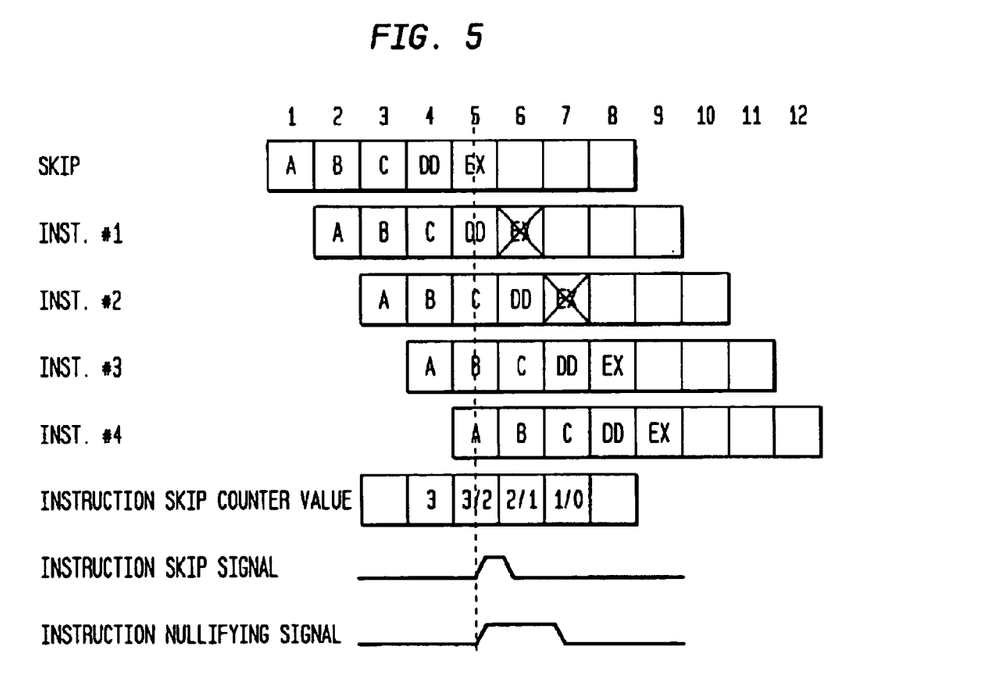
FIG. 5 is a pipeline sequencing diagram illustrating instruction processing that may be achieved utilizing the apparatus of FIG. 3.

The detailed operation of the processing apparatus 100 will now be discussed with continuing reference to FIG. 3 and further reference to FIGS. 4 and 5. FIG. 4 illustrates a basic process flow that is preferably carried out by the processing apparatus 100 of FIG. 3. It is noted, however, that FIG. 4 expressly illustrates but one of many alternative process flows that may be carried out by the processing apparatus 100 in accordance with the various aspects of the present invention. To expressly illustrate all of these alternative flow diagrams would sacrifice clarity and brevity and, therefore, only the exemplary process flow of FIG. 4 (which inherently illustrates such alternative flows) will be discussed in detail herein. FIG. 5 is a sequence diagram of a single scalar pipeline that may be achieved by the processing apparatus 100 that executes the process flow of FIG. 4.

Turning first to FIG. 4, at action 200, a determination is made as to whether a given instruction is a skip instruction in accordance with the present invention. Preferably, this determination is made by either the skip instruction execution unit 102 or the instruction decoder and dispatching unit 108. For example, the determination may be made by identifying particular opcodes of the instructions. Alternatively, the determination may be made by evaluating an offset value of the instruction to determine whether it represents a relatively near forward target address. By way of example, the offset value may be compared to a threshold value and a determination that the instruction is a skip instruction may be made if the offset value is less than (or less than or equal to) the threshold value.

In any case, if the instruction is a skip instruction, then the process flow preferably advances to action 202. On the other hand, if the instruction is not a skip instruction, then the process flow preferably advances to action 204, where normal processing of the instruction within the pipeline is carried out. At action 202, the skip instruction is decoded to obtain various information concerning the instruction, such as the offset value (if it has not already been obtained). The decoding and dispatch operation is preferably carried out by the instruction decoder and dispatching unit 108 (FIG. 3). Turning to FIG. 5, the skip instruction is decoded and dispatched within the fourth stage of the pipeline in cycle 4. It is noted that in cycle 4, instruction #1 has advanced to the third stage of the pipeline (where operation C is carried out), instruction #2 has advanced to the second stage of the pipeline (where operation B is carried out) and instruction #3 has entered the first stage of the pipeline (where operation A is carried out).

Turning again to FIG. 3, the instruction decoder and dispatching unit 108 preferably obtains the offset value and provides same to the instruction skip counter 110, for example, by way of an offset value bus 114. The instruction skip counter 110 preferably stores the offset value in one form or another. At action 206 (FIG. 4), an instruction skip counter value (or count value) is preferably established from the offset value and loaded into the instruction skip counter 110. For example, the count value may be set equal to the offset value, which, in keeping with the example hereinabove, is three. It is noted that the count value represents a potential number of subsequent instructions in the processing pipeline that are to be skipped.

With reference to FIG. 5, the count value is established in the fourth stage of the pipeline, cycle 4, and loaded into the instruction skip counter 110. It is noted that this represents but one example of when the count value may be established and/or loaded into the instruction skip counter 110. This will be discussed in more detail later in this description.

At action 208 (FIG. 4), the skip instruction is executed, preferably within the skip instruction execution unit 102

(FIG. 3). This is also illustrated in FIG. 5, where the skip instruction enters a fifth stage of the processing pipeline in cycle 5, where an execution operation, EX, is performed. More particularly, in conjunction with the execution of the skip instruction, a determination is preferably made as to whether a condition associated with the skip instruction is true (action 210, FIG. 4). If the condition is not true (i.e., it is false) then the process flow preferably advances to action 212, where no branch or skip is performed. On the other hand, if the condition is true, then the skip instruction execution unit 102 (FIG. 3) preferably activates an instruction skip signal and provides same to the instruction skip counter 110 over line 112.

As illustrated in FIG. 5, the activation of the instruction skip signal is preferably achieved by elevating a level of the instruction skip signal to a logic high. With reference to FIG. 4, when the condition is true (action 210) the process flow preferably advances to action 214, where the execution of a next instruction in the pipeline is prohibited. More particularly, the presence of an active instruction skip signal on line 112 preferably causes the instruction skip counter 110 to produce an active instruction nullifying signal and to provide same to the instruction decoder and dispatching unit 108 on line 116. When the instruction nullifying signal is active, e.g., a logic high as shown in FIG. 5, the instruction decoder and dispatching unit 108 preferably provides an indication that a next instruction in the pipeline should be nullified. For example, the instruction decoder and dispatching unit 108 may provide a signal to the arithmetic and logic instruction execution unit 106 indicating that a next instruction in the pipeline should not be executed. With reference to FIG. 5, this is illustrated by the "X" through the execution operation EX in cycle 6 respecting instruction #1.

To put it another way, in cycle 6, the instruction skip counter 110 is preferably operable to activate the instruction nullifying signal, which indicates that the execution of a subsequent instruction in the processing pipeline (e.g., instruction #1) should be prohibited when (i) the value of the instruction skip signal indicates that such instruction should be skipped (i.e., the signal is active), and (ii) the count value differs from a steady state value, such as zero. In cycle 6, the instruction skip signal has already been activated (which has caused the instruction nullifying signal to activate). Further, the count value (which is initially two) does not equal the steady state value of zero. Thus, the instruction nullifying signal remains active (e.g., logic high) and the execution of instruction #1 is nullified.

At action 216 the count value is preferably decremented by 1, which is preferably carried out by the instruction skip counter 110. This is illustrated in FIG. 5, for example, in cycle 6 where the instruction skip counter value changes from a value of two to a value of one. At action 218, a determination is preferably made as to whether the count value has reached the steady state value, e.g., zero. If the count value has not reached the steady state value, then the process flow preferably loops back to action 214 where a next instruction in the pipeline is prohibited. For example, as illustrated in FIG. 5, in cycle 7 the execution of instruction #2 is prohibited (or nullified) because the instruction skip counter value is not equal to the steady state value of zero and the instruction nullifying signal remains active. At action 216 (FIG. 4) the count value is decremented by 1, which is shown in cycle 7 of FIG. 5 by way of the instruction skip counter value going from one to zero and the instruction nullifying signal transitioning from an active to an inactive state.

With reference to FIG. 5, it is noted that the instruction skip counter value is shown as being established and loaded in cycle 4 and decremented in each of cycles 5, 6, and 7 until it reaches a steady state value of zero. Alternative implementations may also be employed, such as establishing and/or loading the instruction skip counter 110 with the instruction skip counter value in cycle 5. In this case, however, the count value may be established to be the offset value minus one. Thus, the count value would initially be two in the cycle in which the skip instruction is executed, cycle 5, but not decremented there as no instruction nullification has taken place. Alternatively, the count value could be established to be equal to the offset value and loaded into the instruction skip counter 110 in cycle 5 so long as it is also decremented in that cycle. In any case, the objectives of the invention are still met.

Although the instruction skip counter value is decremented in accordance with the exemplary embodiments discussed above, alternative implementations are also within the scope of the invention. In general, the instruction skip counter value may be incremented in one or more cycles of the processing pipeline so long as the steady state value is appropriately established. For example, the steady state value may be set to some positive value and the count value may be set to a difference of the steady state value and the offset value. Thus, for example, when the steady state value is ten and the offset value is three, the instruction skip counter value may be set to seven. Thereafter, the instruction skip counter value may be incremented in one or more cycles of the processing pipeline until the count value equals the steady state value of ten. In any case, the objectives of the invention are still met.

It is noted that the treatment of external and/or internal interrupts should be considered when implementing the methods and/or apparatus of the present invention. Preferably, external interrupts, e.g., those interrupts caused by sources other than the instructions within the processing pipeline, are ignored when the execution of instructions are prohibited (e.g., nullified). This can have the advantageous effect of preserving the program counter value when responding to an external interrupt. Internal interrupts, e.g., those interrupts caused by instructions within the processing pipeline, should not occur during instruction nullification and, therefore, need not be acted upon. Alternative approaches to the treatment of interrupts include overwriting the program counter with a branch target address when responding to an interrupt.

While the discussion of FIGS. 3–5 has been directed towards a single scalar processing pipeline (in which only one instruction is dispatched to an execution stage of the pipeline in a particular cycle), super scalar processing pipelines (which dispatch multiple instructions to execution stages of the pipeline in a given cycle) may also enjoy the advantages of the present invention. Indeed, with reference to FIG. 6, a processing apparatus 250 is illustrated which represents a super scalar processing apparatus. The processing apparatus 250 is capable of effecting a branch instruction with a near forward target address without overwriting the value of the program counter and by only nullifying the execution of the instructions within the pipeline to be skipped. FIG. 7 is a pipeline sequence diagram that provides further details of the processing of such a branch (or skip) instruction by the processing apparatus 250.

Figure 6:
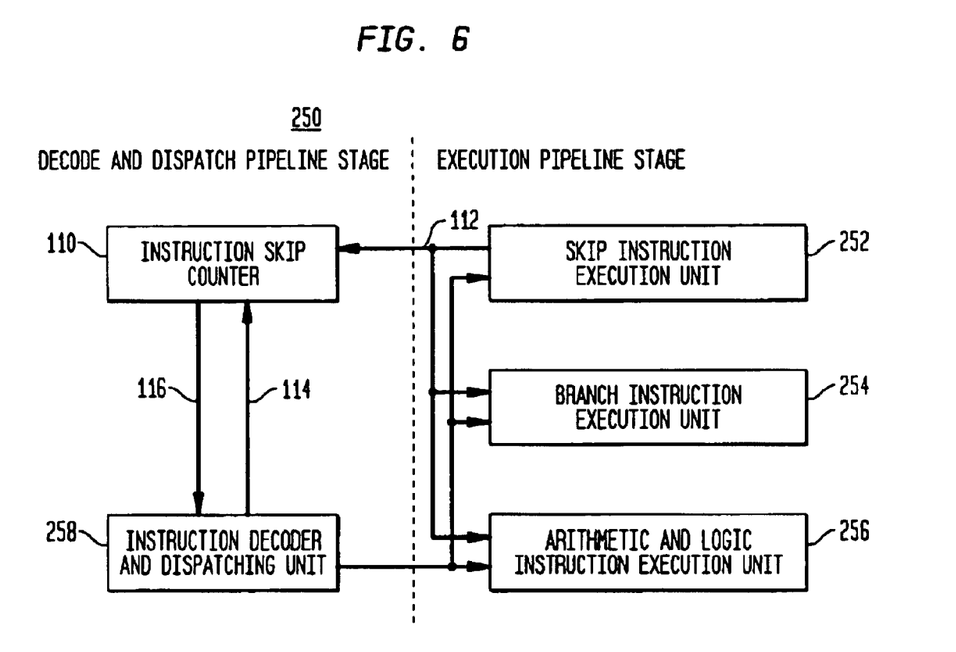
FIG. 6 is a block diagram of an alternative processing apparatus in accordance with one or more further aspects of the present invention.
Figure 7:
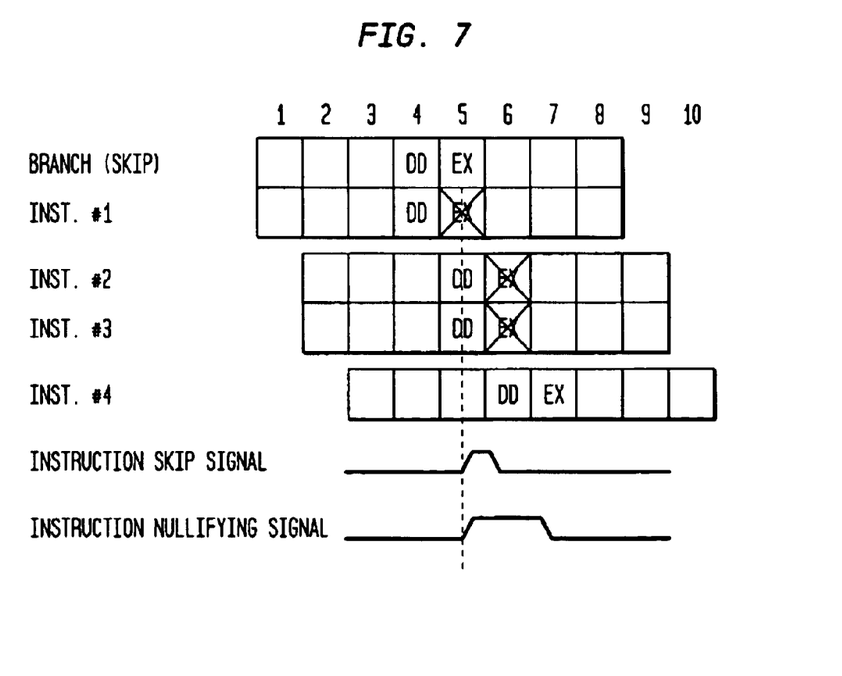
FIG. 7 is a pipeline sequencing diagram illustrating the processing of instructions by the apparatus of FIG. 6.

In general, the functional blocks forming the processing apparatus 250 of FIG. 6 are substantially similar to the functional blocks forming the processing apparatus 100 of FIG. 3 in terms of producing an instruction skip counter value, an instruction skip signal, and an instruction nullifying signal. On the other hand, the skip instruction counter 110 is preferably operable to increment or decrement the count value in a given cycle of the processing pipeline by an amount that is proportional to a number of the instructions that are prohibited from being executed (i.e., nullified) in that cycle, which may be greater than one.

By way of example, the processing apparatus 250 may represent a super scalar processor pipeline that is capable of dispatching two instructions to the execution stage within a given cycle of the pipeline. With reference to FIG. 7, it is assumed that the offset value is four, and that instructions #1–#3 should be skipped when the condition of the branch (skip) instruction is true. The branch (skip) instruction and instruction #1 enter the execution stage of the pipeline in cycle 5. Since the instruction nullifying signal is active in cycle 5, however, the execution of the next instruction in the pipeline after the branch instruction (i.e., the execution of instruction #1) is prohibited as illustrated by the "X" in the execution operation EX box respecting instruction #1.

In accordance with the invention, the count value is incremented or decremented by an amount proportional to one because the execution of one instruction (i.e., instruction #1) was prohibited. In cycle 6, however, the execution of two instructions (i.e., instruction #2 and instruction #3), are prohibited and, therefore, the count value is incremented or decremented by an amount proportional to two. In cycle 7, the execution of instruction #4 is permitted because the instruction nullifying signal is inactive (i.e., the count value reached the steady state value).

Advantageously, the present invention facilitates the processing of a forward branch instruction in a pipeline without modifying the value of the program counter and by nullifying the executing of only those instructions that should be skipped. This improves pipeline execution and, ultimately, data throughput.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for use in a processing pipeline operable to dispatch a plurality of instructions up to a first number of instructions per cycle to execution stages of the pipeline, comprising:
  decoding a skip instruction in a first cycle of the processing pipeline to determine a total number of subsequent instructions in the processing pipeline that are to be skipped;
  executing the skip instruction in a second cycle; and
  prohibiting execution of the subsequent instructions in the processing pipeline including:
    prohibiting execution of a second number of instructions subsequent to the skip instruction in the second cycle, the second number being variable between zero and one less than the first number; and
    thereafter, if any subsequent instructions of the total number remain to be skipped, then prohibiting execution of a third number of instructions in a third cycle subsequent to the second cycle, the third number being variable up to the lesser of: the number of subsequent instructions which remain to be skipped and the first number.

2. The method of claim 1, wherein the step of prohibiting execution of the subsequent instructions in the processing pipeline effects a forward branch in the instructions of the processing pipeline without modifying a program counter of the processing pipeline.

3. The method of claim 1, wherein the step of prohibiting execution of the subsequent instructions in the processing pipeline effects a forward branch in the instructions of the processing pipeline by nullifying only those instructions already in the pipeline that should be skipped.

4. The method of claim 3, wherein the effective forward branch is achieved without re-introducing instructions into the pipeline that were previously nullified.

5. The method of claim 1, further comprising determining whether a branch instruction is a skip instruction by (i) determining whether the branch instruction includes a forward offset value; and (ii) determining whether the forward offset value is less than or equal to a threshold value.

6. The method of claim 1, wherein the skip instruction specifies that the total number of subsequent instructions are only to be skipped upon occurrence of a specified condition, the method further comprising determining whether the specified condition occurs, such that the total number of subsequent instructions are prohibited from being executed only upon occurrence of the specified condition.

7. The method of claim 6, further comprising:
  obtaining an offset value when decoding the skip instruction, the offset value representative of the total number of subsequent instructions in the processing pipeline that are to be skipped;
  using the offset value to establish a count value; and
  prohibiting execution of the total number of subsequent instructions represented by the count value.

8. The method of claim 6, further comprising permitting execution of the total number of subsequent instructions when the specified condition does not occur.

9. The method of claim 8, further comprising:
  incrementing or decrementing the count value for each instruction skipped until the count value reaches a steady state value; and
  thereafter permitting execution of the instructions in the processing pipeline.

10. The method of claim 1, wherein the processing pipeline includes a super-scalar processing pipeline.

11. An apparatus including a processing pipeline operable to dispatch a plurality of instructions up to a first number of instructions per cycle to execution stages of the processing pipeline, comprising:
  an instruction decoding unit operable to decode a skip instruction in a first cycle of the processing pipeline to determine a total number of subsequent instructions in the processing pipeline that are to be skipped;
  a skip instruction unit operable to execute the skip instruction in a second cycle; and
  an instruction skip counter operable to produce an instruction nullifying signal such that subsequent instructions in the processing pipeline are prohibited from being executed including
  a second number of instructions subsequent to the skip instruction prohibited from being executed in the second cycle, the second number being variable between zero and one less than the first number; and
  when any subsequent instructions of the total number remain to be skipped after prohibiting execution of the second number of instructions, a third number of instructions prohibited from being executed in a third cycle subsequent to the second cycle, the third number being variable up to the lesser of: the number of subsequent instructions which remain to be skipped and the first number.

12. The apparatus of claim 11, wherein the skip instruction unit is operable to set a count value indicating the total number of subsequent instructions that are to be skipped and the instruction skip counter is further operable to produce a signal indicating that the subsequent instructions in the processing pipeline should be executed when at least one of (i) the value of the instruction nullifying signal indicates that such instructions should not be skipped, and (ii) the count value equals the steady state value.

13. The apparatus of claim 12, wherein the skip instruction counter is further operable to increment or decrement the count value in one or more cycles of the processing pipeline until the count value equals the steady state value.

14. The apparatus of claim 13, wherein:
the skip instruction counter is further operable to set the count value equal to an offset value obtained by the instruction decoding unit by decoding the skip instruction, and to decrement the count value in at least one of the second cycle and the third cycle of the processing pipeline; and
the steady state value is zero.

15. The apparatus of claim 11, further comprising an instruction execution unit operable to execute instructions other than the skip instructions, and to prohibit execution of such instructions in accordance with the instruction nullifying signal.

16. The apparatus of claim 11, wherein the prohibiting of execution of the subsequent instructions in the processing pipeline effects a forward branch in the instructions of the processing pipeline without modifying a program counter of the processing pipeline.

17. The apparatus of claim 11, wherein the prohibiting of execution of the subsequent instructions in the processing pipeline effects a forward branch in the instructions of the processing pipeline by nullifying only those instructions already in the pipeline that should be skipped.

18. The apparatus of claim 17, wherein the effective forward branch is achieved without re-introducing instructions into the pipeline that were previously nullified.

19. The apparatus of claim 11, wherein the skip instruction unit is further operable to determine whether a condition specified by the skip instruction occurs, in determining whether the total number of subsequent instructions are to be skipped.

20. The apparatus of claim 11, wherein at least one of the skip instruction unit and the instruction decoding unit is further operable to determine whether a branch instruction is a skip instruction by (i) determining whether the branch instruction includes a forward offset value; and (ii) determining whether the forward offset value is less than or equal to a threshold value.

* * * * *

UNITED STATES PATENT AND TRADEMARK OFFICE
CERTIFICATE OF CORRECTION

PATENT NO. : 6,988,187 B2  Page 1 of 1
APPLICATION NO. : 10/200790
DATED : January 17, 2006
INVENTOR(S) : Hidetaka Magoshi It is certified that error appears in the above-identified patent and that said Letters Patent is hereby corrected as shown below:

On the Title page before Item "(57) ABSTRACT" insert --Attorney, Agent, or Firm—Lerner, David, Littenberg, Krumholz & Mentlik LLP--.

Signed and Sealed this

Seventh Day of November, 2006

JON W. DUDAS
*Director of the United States Patent and Trademark Office*